United States Patent Office 3,613,221
Patented Oct. 19, 1971

3,613,221
METHOD FOR CONNECTING AN ANCHORING DEVICE TO THE REAR OF A FRONTAL PLATE OR THE LIKE
Cornelis Jan Pronk, Castricum, Netherlands, assignor to N.V. Bataafsche Aanneming Maatschappij v/h F.a.J. van der Wal & Zoon, Amsterdam, Netherlands
Filed Mar. 17, 1969, Ser. No. 808,017
Claims priority, application Netherlands, Mar. 18, 1968, 6803835
Int. Cl. B23p 19/00
U.S. Cl. 29—526    6 Claims

ABSTRACT OF THE DISCLOSURE

A method of connecting an anchoring device to the rear surface of a frontal plate including providing a blind hole in the rear surface of the frontal plate, inserting a projecting end portion of the anchoring device into the blind hole, providing a second blind hole in the frontal plate extending transversely through said first blind hole in alignment with a transversely positioned bore in said projecting end portion, and insert a pin into the transverse bore so as to extend into the second blind hole and thereby interconnect the anchoring device and the frontal plate.

---

The invention relates to a method for connecting an anchoring device to the rear of a frontal plate or the like; and to an anchoring device for a frontal plate, suitable for application in this method.

Until now frontal plates, which are made of stone, are anchored by means of anchoring devices, which are locked in holes in the lower edge, the upper edge and/or the vertical side edges of these frontal plates. In addition thereto, or as an alternative, anchoring devices are applied which interlock with slots cut into the rear surface of the frontal plate. The number of anchors to be used depends a.o. on the thickness, the width and the height of the frontal plate.

The installation of a frontal plate anchor of the above types requires a thickness of the frontal plate of at least 3 centimetres as this plate would otherwise be weakened too much by the holes in its edges and/or by the slots in its rear surface.

Of course, it would be advantageous to use thinner frontal plates in order to reduce their costs.

It is a primary object of the present invention to provide a method for connecting an anchoring device to the rear of a frontal plate or the like, wherein this frontal plate is only slightly weakened so that this method is particularly suitable for use with thin frontal plates.

It is a further object of the present invention to provide a method for connecting an anchoring device to the rear of a frontal plate or the like, which is simple to execute and therefore does not require skilled labour.

To this end, the method for connecting and anchoring device to the rear of a frontal plate or the like is characterized in that a blind hole is provided in the frontal plate, whereupon an anchoring device comprising an end part with a transverse bore therethrough enclosing an acute angle with the longitudinal axis of said end part is fittingly inserted in said blind hole so that the rear end of said transverse bore is situated at least in part behind the frontal plate, whereafter a second blind hole is drilled into the frontal plate through the transverse bore in the anchoring device and a pin is fittingly introduced in the transverse bore and in said second blind hole.

The second blind hole may be inclined downwards from its opening in the rear surface of the frontal plate, thus preventing the pin from falling out of the transverse bore.

As an alternative, or in combination therewith, the pin in the transverse bore may be locked against any backward displacement, for instance by deforming the anchoring device at the rear end of the transverse bore.

The invention further comprises an anchoring device for a frontal plate, suitable for application in the above method.

The invention will now be explained with reference to the drawing, which shows the successive steps of the method according to the invention.

Figure 3:
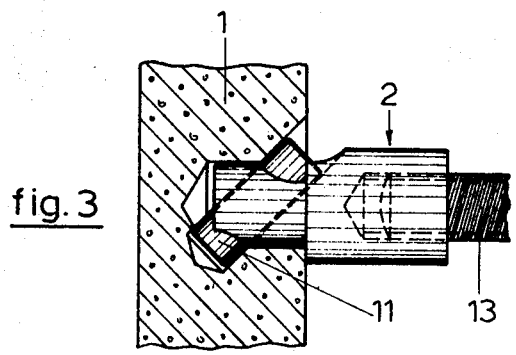
FIG. 3 shows the anchoring device locked relative to the frontal plate by means of the pin.

According to the drawing, an anchoring device 2 is connected to the rear of a frontal plate 1. This anchoring device 2 comprises a cylindrical end part 3 with a transverse bore 4 enclosing an acute angle, preferably an angle of about 45°, with the central axis of the end part 3. This transverse bore 4 ends at its one side in or adjacent the end face 5 of the end part 3, and at its other side in a shoulder 6, which connects the end part 3 to the cylindrical rear part 7 of the anchoring device 2.

As an alternative, the transverse bore 4 may end at its one side at a distance from the end face 5 of the end part 3, and/or at its other side beyond the shoulder 6 in the rear part 7 of the anchoring device 2.

At first a first blind hole 8 is drilled from the rear side into the frontal plate 1, the central axis of said blind hole being perpendicular to the rear surface 9 of the frontal plate, whilst its diameter is identical with that of the cylindrical end part 3 of the anchoring device 2.

Then, the end part 3 of the anchoring device 2 is inserted in the blind hole 8 until its shoulder 6 strikes the rear surface 9 of the frontal plate.

Figure 2:
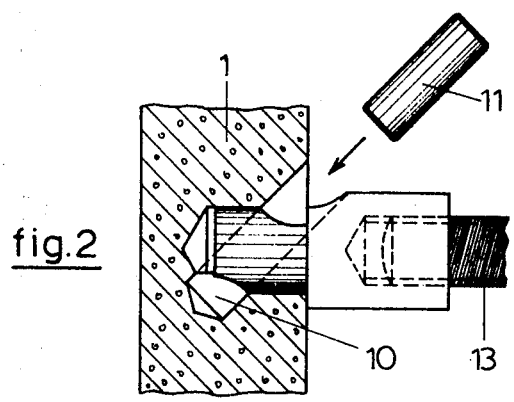
FIG. 2 shows the anchoring device in the position wherein its end part is inserted in the first blind hole, whereafter the second blind hole has been drilled into the frontal plate through the transverse bore in the anchoring device.
Figure 1:
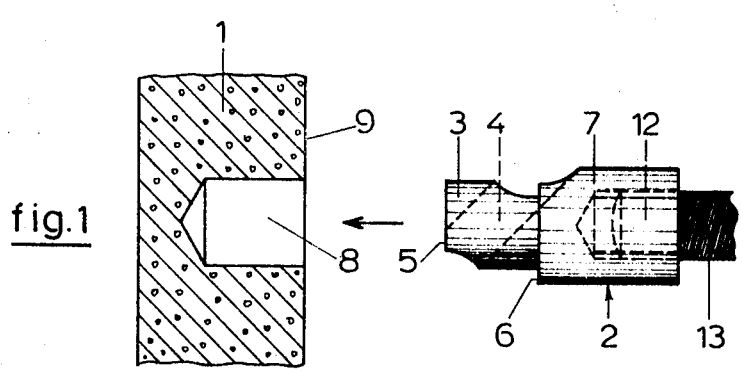
FIG. 1 shows an embodiment of the anchoring device, as well as the frontal plate wherein the first blind hole has been drilled.

Thereupon, the anchoring device 2 is rotated until the transverse bore 4 opens on the side facing the upper edge of the frontal plate 1, whereafter a second blind hole 10 is drilled into the frontal plate 1 through the transverse bore 4 in the anchoring device 2 (FIG. 2).

A pin 11 is subsequently inserted into the anchoring device 2 through the transverse bore 4, and fittingly extends through the transverse bore 4 and in the second blind hole 10.

Since the second blind hole 10 is inclined downwards from its opening in the rear surface 9 of the frontal plate, the pin 11 will maintain its opposition in the transverse bore 4 and in the second blind hole 10.

If desired, the pin 11 may be locked in the transverse bore 4 against any backward displacement, preferably by deforming the anchoring device 2 at the rear end of the transverse bore 4, for instance by means of a pair of pliers, whereupon the installation of the anchoring device 2 in the frontal plate 1 is completed.

Of course, it is absolutely necessary to lock the pin 11 against backward displacement in the transverse bore 4 in the case that the second blind bore 10 is drilled in a direction other than the one shown in the drawing, so that the danger exists of the pin 11 falling out of the transverse bore 4 by gravity.

The rear part 7 of the anchoring device 2 comprises a threaded hole 12, wherein a threaded end of a stay 13 may be screwed, which is to be connected to the wall structure behind the frontal plate 1. Of course it is possible to use other means for this purpose.

The invention is not restricted to the embodiment shown in the drawing, which may be varied in different manners within the scope of the appended claims.

I claim:

1. A method of connecting an anchoring device to the rear surface of a frontal plate or the like, and wherein said anchoring device includes a projecting end portion having a generally transverse bore hole extending therethrough at an acute angle to the longitudinal axis of said end portion, comprising the steps of; providing a blind hole into said frontal plate through the rear surface thereof, said blind hole having peripheral dimensions corresponding essentially to the configuration of said projecting end portion; inserting said projecting end portion of the anchoring device into said blind hole to an extent whereby the rearwardly positioned opening in said end portion formed by said bore hole is located at least partially externally of the rear surface of said frontal plate; providing a second blind hole into said frontal plate in line with and through said transverse bore hole in said end portion of the anchoring device; and inserting pin means into said transverse bore hole and extending into said second blind hole in closely interfitted engagement therewith so as to position said frontal plate and anchoring device into an interconnected relationship.

2. A method as claimed in claim 1 wherein said second blind hole is located in said frontal plate at a generally downwardly inclination from its opening in the rear wall of said frontal plate.

3. A method as claimed in claim 1 including the step of locking said pin means into said transverse bore hole in said projecting end portion so as to prevent backward motion of said pin means tending to disengage the latter from said second blind hole in said frontal plate.

4. A method as claimed in claim 3 including the step of deforming the portion of said transverse bore hole rearwardly and outwardly of the pin means positioned thereon so as to effectively restrain said pin means in said bore hole against backward motion.

5. A method as claimed in claim 1 wherein said first blind hole in said frontal plate is formed by drilling into the rear surface of the latter, said projecting end portion of said anchoring device being essentially cylindrical and dimensioned so as to closely engage said drilled hole.

6. A method as claimed in claim 5 wherein said first blind hole is drilled into said frontal plate so as to extend into said plate generally normal to the rear surface thereof.

References Cited

UNITED STATES PATENTS

| 1,246,122 | 11/1917 | Livesay | 287—53 (T.K.) |
| 1,499,432 | 7/1924 | Williston et al. | 287—53 (T.K.) |
| 1,940,455 | 12/1933 | Kilpela | 287—53 (T.K.) |

FOREIGN PATENTS

| 694,139 | 9/1964 | Canada | 287—53 T.K. |

CHARLIE T. MOON, Primary Examiner

U.S. Cl. X.R.

144—309.14, 318; 287—53